(12) United States Patent
Verrochi

(10) Patent No.: US 8,308,417 B1
(45) Date of Patent: Nov. 13, 2012

(54) METHOD AND SYSTEM FOR TRANSPORTING, LOADING, AND UNLOADING VARIOUS TYPES OF GOODS

(76) Inventor: Joseph Verrochi, Tyrone, GA (US)

( * ) Notice: Subject to any disclaimer, the term of this patent is extended or adjusted under 35 U.S.C. 154(b) by 320 days.

(21) Appl. No.: 12/549,317

(22) Filed: Aug. 27, 2009

Related U.S. Application Data

(60) Provisional application No. 61/138,709, filed on Dec. 18, 2008.

(51) Int. Cl.
*B60P 1/44* (2006.01)
*B60J 5/06* (2006.01)
*B62D 33/04* (2006.01)

(52) U.S. Cl. .............. 414/467; 296/186.2; 296/186.4; 414/539

(58) Field of Classification Search .......... 296/186.1, 296/186.2, 186.3, 186.4, 138; 414/467, 539
See application file for complete search history.

(56) References Cited

U.S. PATENT DOCUMENTS

| | | | |
|---|---|---|---|
| 2,986,424 A | 5/1961 | Larsen | |
| 3,709,552 A * | 1/1973 | Broadbent | 296/186.2 |
| 4,762,361 A | 8/1988 | Horton et al. | |
| 4,772,063 A | 9/1988 | Amy | |
| 4,826,236 A | 5/1989 | Bennett | |
| 4,826,474 A | 5/1989 | Holmes | |
| 4,856,843 A | 8/1989 | Elliott | |
| 4,952,009 A | 8/1990 | Mountz et al. | |
| 5,054,295 A | 10/1991 | Goulooze | |
| 5,215,349 A * | 6/1993 | Horton | 296/186.2 |
| 5,255,952 A | 10/1993 | Ehrlich | |
| 5,501,503 A | 3/1996 | Thayer | |
| 5,599,058 A * | 2/1997 | Carter et al. | 296/186.1 |
| 5,813,821 A | 9/1998 | Braud | |
| 6,877,794 B2 * | 4/2005 | Bush, Sr. | 296/186.2 |
| 6,890,020 B2 * | 5/2005 | Bush, Sr. | 296/186.4 |
| 7,125,068 B2 * | 10/2006 | Waldorf | 296/181.1 |

FOREIGN PATENT DOCUMENTS

| | | | | |
|---|---|---|---|---|
| EP | 0132103 A1 * | 1/1985 | | 296/138 |
| FR | 2580598 A1 * | 10/1986 | | 296/186.1 |
| GB | 2220621 A * | 1/1990 | | 296/186.1 |

* cited by examiner

*Primary Examiner* — James Keenan
(74) *Attorney, Agent, or Firm* — Smith Risley; Steven P. Wigmore

(57) ABSTRACT

A method and system for transporting, loading, and unloading various types of goods can include a motor vehicle having a tractor portion and a rectilinear shaped cargo area portion. The cargo area portion can include three traditional sides and a curtain side. The various parts of the system can include, but are not limited to, the following: a front, first width, solid side of the rectilinear shaped cargo area that is adjacent to a tractor portion. The system can further include a solid side along a first length of the rectilinear shaped cargo area. A first door can be contained with the solid side along the first length. Adjacent to the first door, a side-mount liftgate can be positioned. A rear, second width, solid side of the rectilinear shaped cargo area can contain a second door. The second door can be a rolling type door.

22 Claims, 13 Drawing Sheets

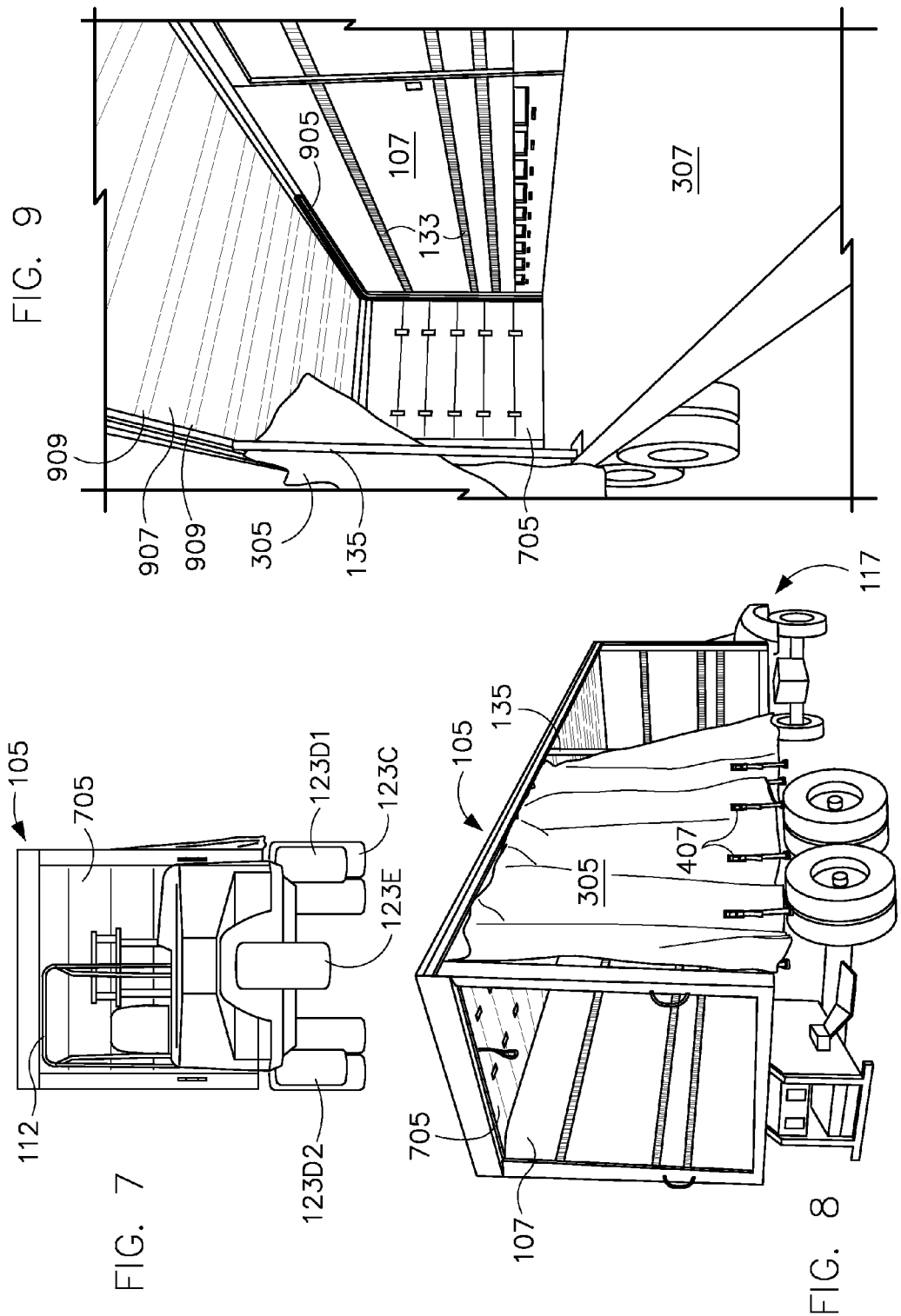

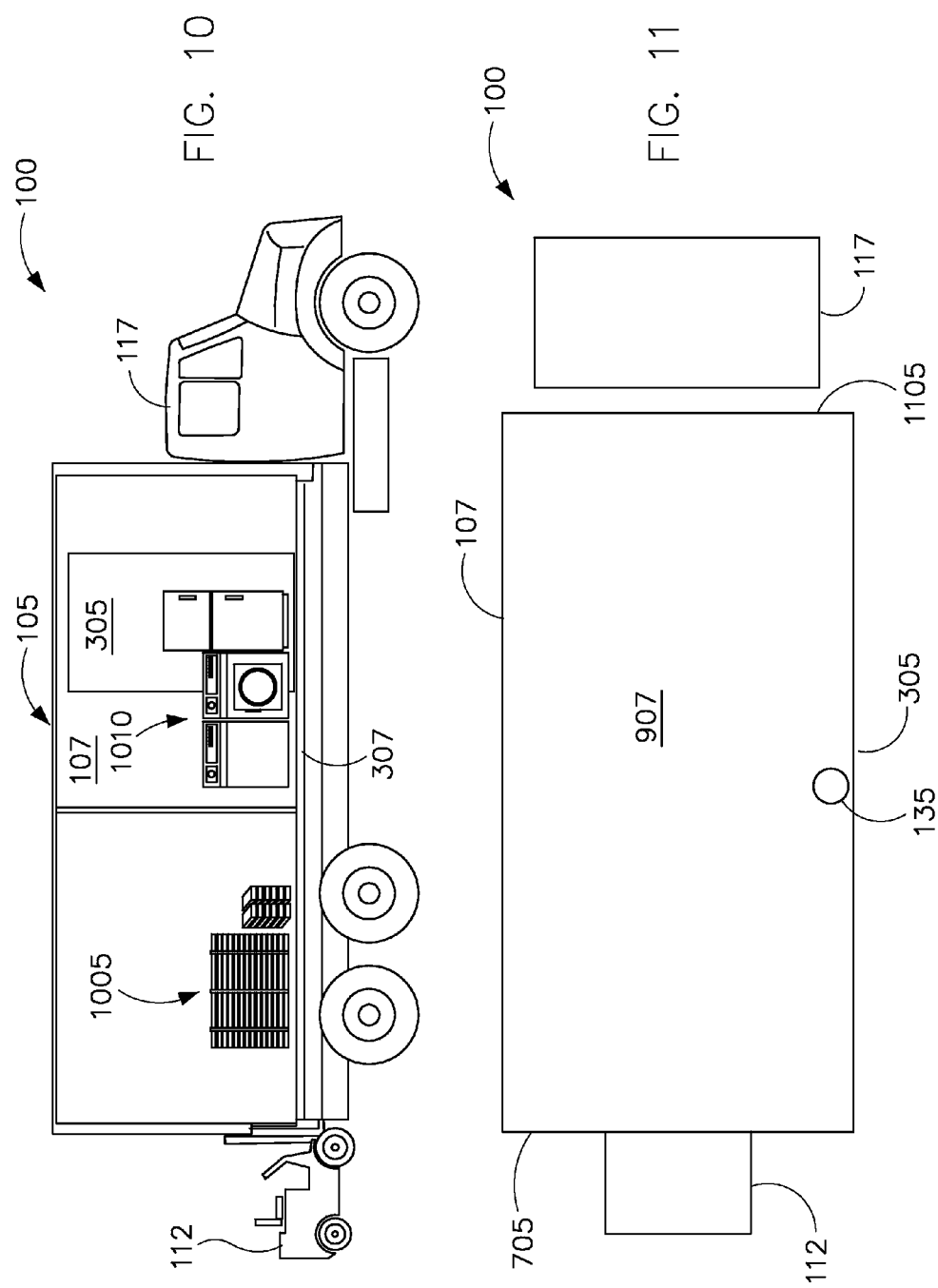

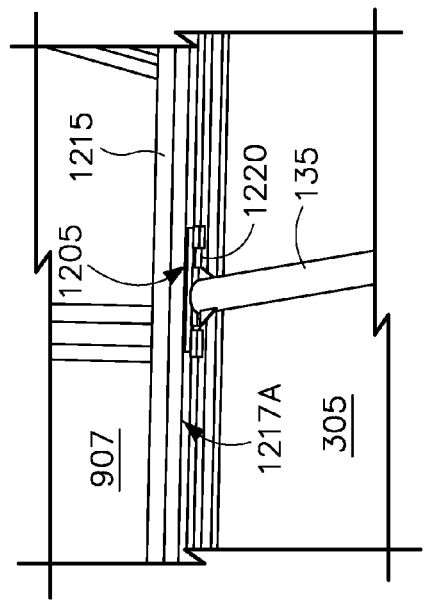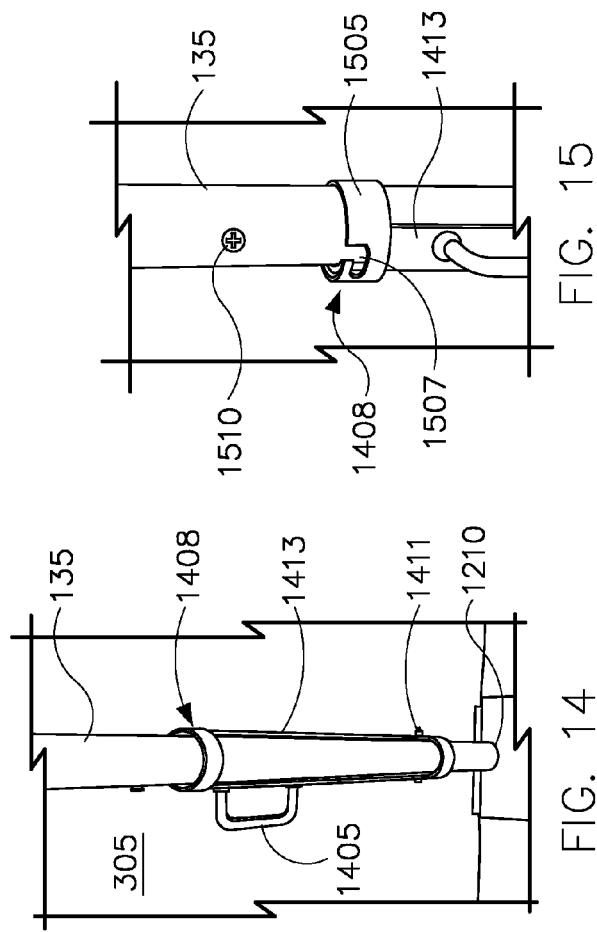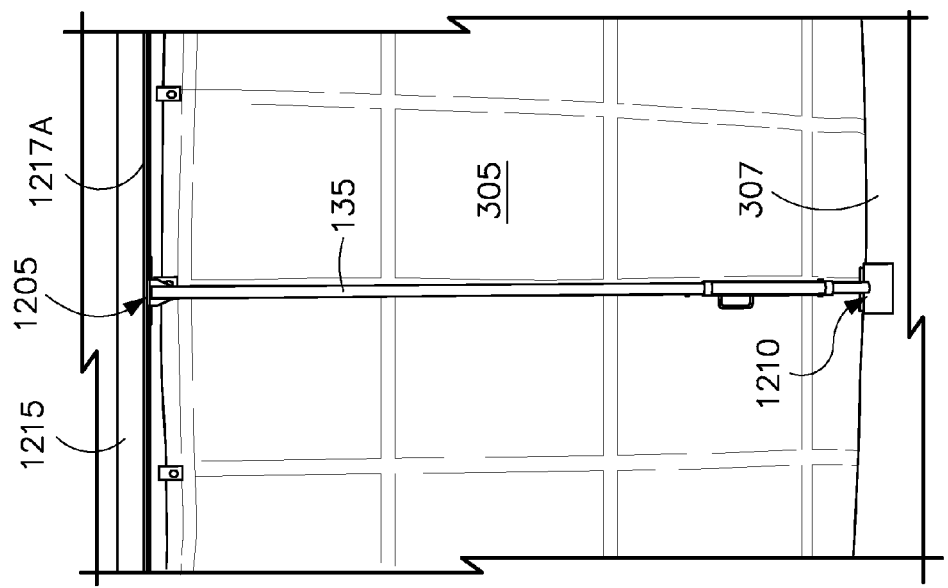

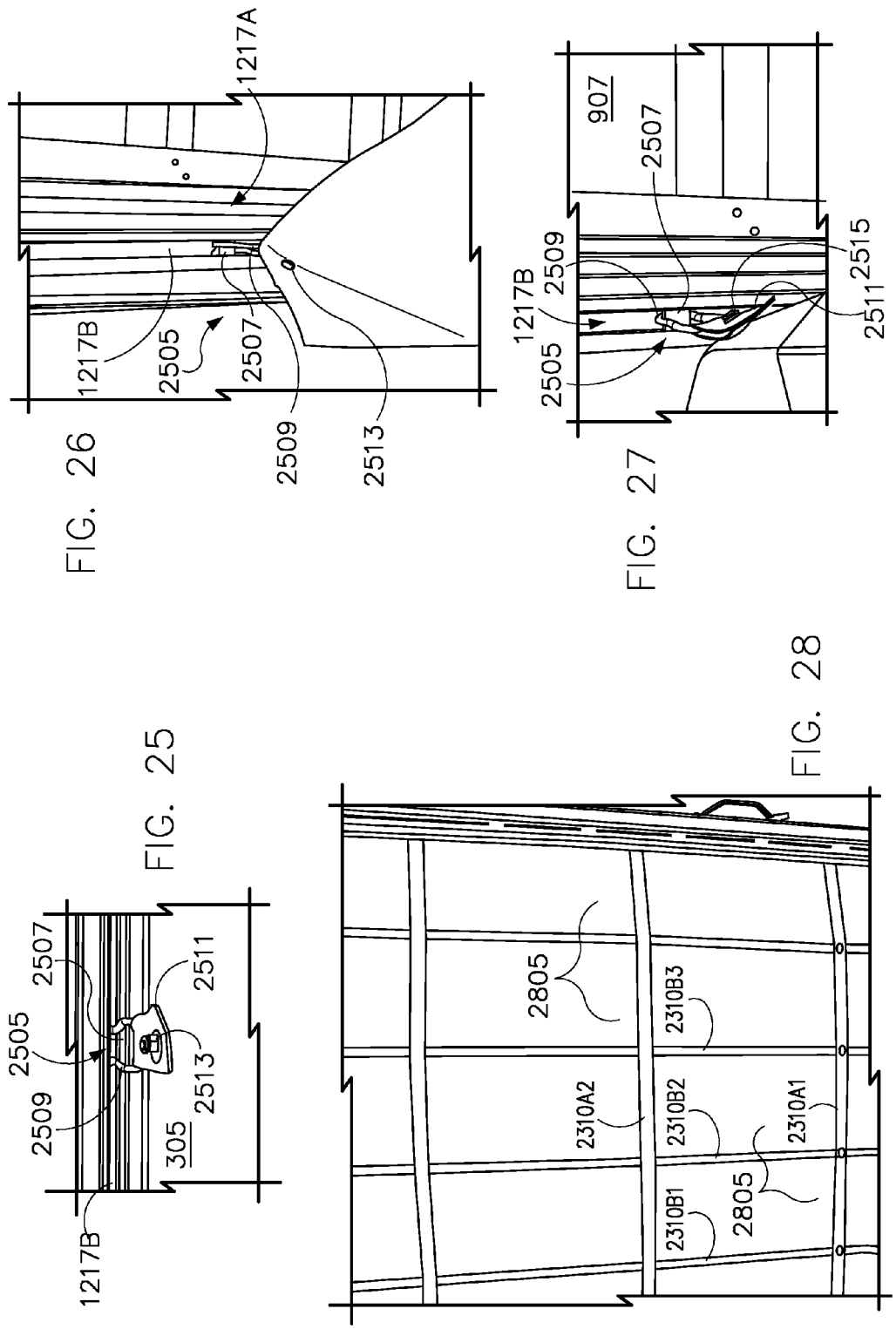

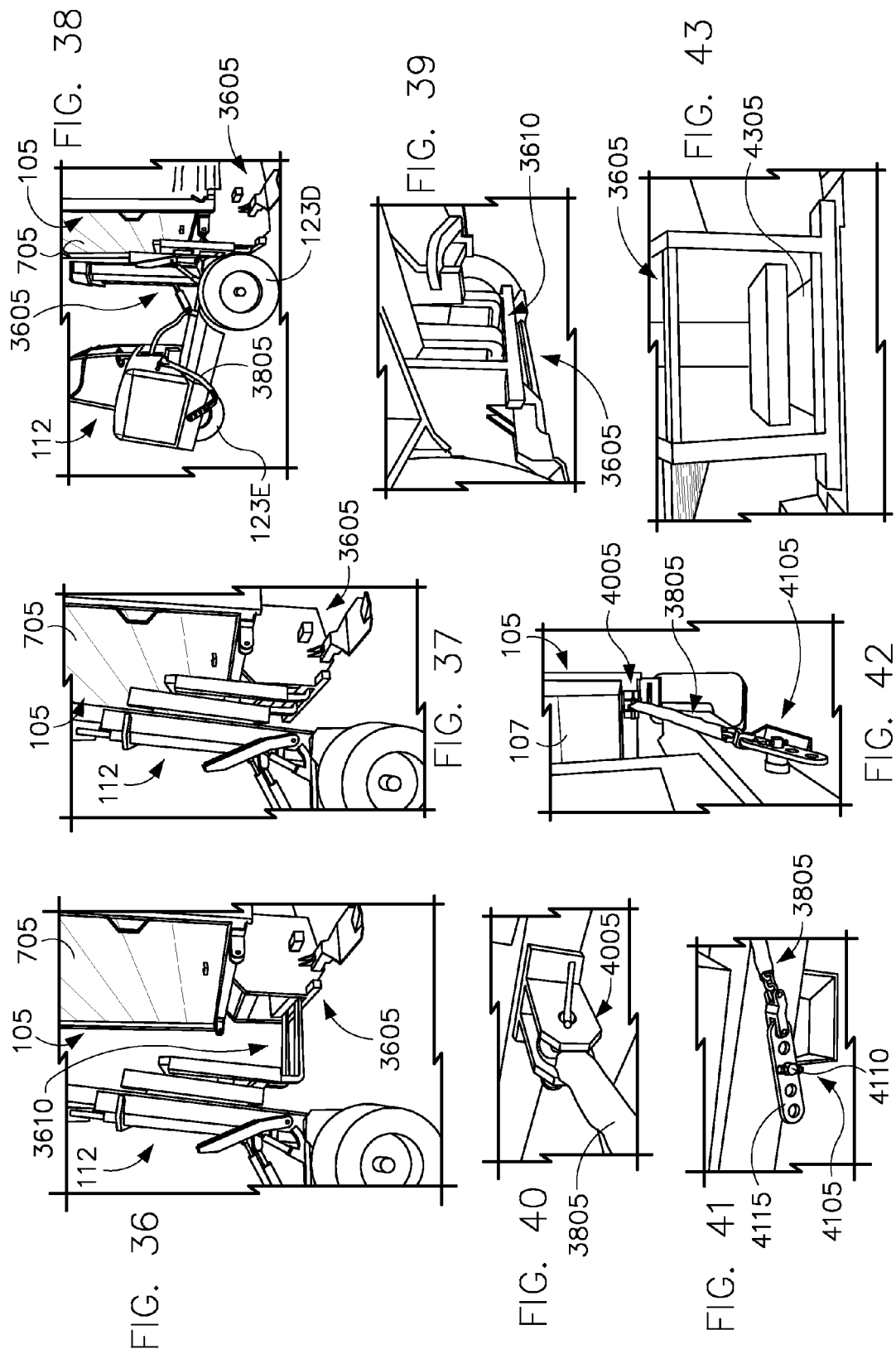

METHOD AND SYSTEM FOR TRANSPORTING, LOADING, AND UNLOADING VARIOUS TYPES OF GOODS

STATEMENT REGARDING RELATED APPLICATIONS

The present application claims priority to provisional patent application entitled, "METHOD AND SYSTEM FOR TRANSPORTING, LOADING, AND UNLOADING VARIOUS TYPES OF GOODS," filed on Dec. 18, 2008 and assigned U.S. Application Ser. No. 61/138,709, the entire contents of which are hereby incorporated by reference.

FIELD OF INVENTION

The invention relates to the shipping of movable goods. More particularly, the invention relates to cargo areas of vehicles, such as motor vehicles, for shipping movable goods.

BACKGROUND OF THE INVENTION

Traditionally, a vendor of a wide variety of consumer goods must employ at least two different motor vehicles for transporting the wide variety of consumer goods. For example, to transport movable goods which need protection from environmental elements, such as weather and dirt, a truck with a fully enclosed cargo area to protect the consumer goods must be used. Such consumer goods which need protection from environmental elements can include, but are not limited to, appliances like washers, dryers, refrigerators, etc. To load and unload these type of consumer goods, the truck with the fully enclosed cargo area typically has a rear mounted liftgate which can raise and lower the goods relative to the cargo area.

Meanwhile, goods which usually do not need protection from environmental elements can include, but are not limited to, cement, bricks, and lumber. To transport these type of goods which do not need protection from environmental elements, a vendor typically uses a flat bed truck that does not have any enclosed areas in the cargo area. Without enclosed areas of the cargo area, easy loading and unloading can be achieved with the assistance of cargo moving machines, such as a forklift.

With this wide variety of consumer goods, a vendor must use and employ these two different type of trucks as discussed above. Maintaining and operating two different types of trucks can become expensive for the consumer goods vendor. For example, two trucks will require two separate fuel tanks that must be filled.

Accordingly, there is a need in the art for a method and system for transporting, loading, and unloading various types of goods that employs only a single motor vehicle. A further need in the art exists for a method and system which combines the positive attributes of motor vehicles with enclosed cargo areas with motor vehicles having flat bed open cargo areas.

SUMMARY OF THE INVENTION

A method and system for transporting, loading, and unloading various types of goods can include a motor vehicle having a tractor portion and a rectilinear shaped cargo area portion. The cargo area portion can include three traditional sides and a curtain side.

The various parts of the system can include, but are not limited to, the following: a front, first width, solid side of the rectilinear shaped cargo area that is adjacent to a tractor portion. The system can further include a solid side along a first length of the rectilinear shaped cargo area. A first door can be contained with the solid side along the first length. Adjacent to the first door, a side-mount liftgate can be positioned. The side-mount liftgate can comprise a hydraulic system that can lift heavy loads to and from a ground level to and from a level parallel with a planar surface defined by a floor portion of the cargo area of the motor vehicle. A rear, second width, solid side of the rectilinear shaped cargo area can contain a second door. The second door can be a rolling type door that has panels which are rolled along a curved track.

A forklift can be attached to a rear portion of the cargo area adjacent to the second width, solid side and adjacent to the curtain side of the cargo area. The curtain side can be positioned along a second length of the rectilinear shaped cargo area. The curtain side can be made from a flexible, sheet-like material that can be easily contracted and expanded along the second length of the rectilinear shaped cargo area. The flexible, sheet-like material can include, but is not limited to, a flexible canvas or any other suitable industrial fabric. The flexible sheet-like material can be slidably and fixedly attached near a roof portion of the cargo area. A lower portion of the curtain can be fastened to a bed or flat portion of the cargo area with mechanical fasteners. Any of a variety of mechanical fasteners can be used without departing from the invention. For example, the mechanical fasteners used to secure the flexible curtain side could comprise straps with locks, hooks, clips, or tie cords. Beneath the curtain side, a plurality of cargo securing mechanisms can be positioned for attaching and securing cargo within the cargo area.

A removable center beam positioned in a central area of the curtain side can provide support for a central region of the roof for the rectilinear cargo area. The removable center beam can comprise a solid material, such as, but not limited to, metal.

The method and system are not limited to a rectilinear shaped cargo area and can include other shapes, such as, square, oval, cylindrical, etc. The method and system allows goods which need protection from the environmental elements, such as the weather, to be stored in and removed from areas adjacent to the side door and side-mount liftgate. These goods can include, but are not limited to, washers, dryers, refrigerators, etc. These goods can be removed from the cargo area using the side-mount liftgate.

The method and system allow goods which usually do not need protection from environmental elements to be stored in areas away from the side mount liftgate such as in the rear portion of the cargo area. However, these goods which do not need protection from environmental elements may also be positioned near the side mount liftgate as desired. These goods which usually do not need protection from environmental elements can include, but are not limited to, cement, bricks, and lumber. These goods can be placed on skids and the skids can be picked up with the fork-lift and removed from the "curtain" side of the cargo area with the fork-lift.

According to one exemplary embodiment, there is no separation or walls in the cargo area to divide the different types of goods from one another. For example, there is no solid wall along the center removable beam that separates the two different sets of goods and that are opposite to each other relative to the center, removable beam. The cargo area can comprise just one large, rectilinear sized volume.

BRIEF DESCRIPTION OF THE DRAWINGS

FIG. 7 is a full rear view of the cargo area illustrated in FIG. 1 with the cargo moving machine in a secured position according to one exemplary embodiment of the invention.

FIG. 8 is perspective, rear view of the cargo area illustrated in FIG. 1 with the cargo moving machine removed from the motor vehicle and further illustrating a rear rolling door in an elevated position and the flexible curtain in a partially open position according to one exemplary embodiment of the invention.

FIG. 9 is a perspective, side view of the cargo area illustrated in FIG. 1 with the flexible curtain in an open position, the rear rolling door in a closed position, and with a removable beam in a secured position according to one exemplary embodiment of the invention.

FIG. 10 is a side view of the system including a motor vehicle illustrated in FIG. 1 in which the flexible curtain not illustrated and with exemplary goods which may be transported in the cargo area according to one exemplary embodiment of the invention.

FIG. 11 is a functional block diagram illustrating an elevational or top view of the system including a motor vehicle illustrated in FIG. 1 according to one exemplary embodiment of the invention.

FIG. 12 is a internal view of the cargo area of the system illustrated in FIG. 1 with the removable beam in a secured position and the flexible curtain in a fully extended and secured position according to one exemplary embodiment of the invention.

FIG. 13 is an internal view of the cargo area of the system illustrated in FIG. 1 that illustrates a first end of the removable beam and how it is coupled to a roof of the cargo area according to one exemplary embodiment of the invention.

FIG. 14 is an internal view of the cargo area of the system illustrated in FIG. 1 which also illustrates a second end of the removable beam and how it is coupled to a floor of the cargo area according to one exemplary embodiment of the invention.

FIG. 15 is a side view of the removable beam that illustrates a locking mechanism for the beam in a locked position according to one exemplary embodiment of the invention.

FIG. 25 is side view of a slider coupler which connects the flexible curtain to a roof of the cargo area according to one exemplary embodiment of the invention.

FIG. 26 is a side view of the slider coupler of FIG. 25 with the flexible curtain in a retracted position according to one exemplary embodiment of the invention.

FIG. 27 is a perspective, side view of the slider coupler of FIG. 26 according to one exemplary embodiment of the invention.

FIG. 28 is an internal view of the flexible curtain relative to the cargo area and which further illustrates rectangular shaped support straps along a surface of the flexible curtain according to one exemplary embodiment of the invention.

FIG. 36 is a rear view of the cargo area with the cargo moving machine being positioned for engaging a bottom portion of the cargo area according to one exemplary embodiment of the invention.

FIG. 37 is a rear view of the cargo area with the cargo moving machine engaged with a bottom portion of the cargo area and with the cargo moving machine's wheels in contact with the ground according to one exemplary embodiment of the invention.

FIG. 38 is a rear view of the cargo area with the cargo moving machine engaged with a bottom portion of the cargo area and elevated relative to the ground according to one exemplary embodiment of the invention.

FIG. 39 is a close up, rear view of the cargo area with the cargo moving machine engaged with a bottom portion of the cargo area according to one exemplary embodiment of the invention.

FIG. 40 is a close up view of a first end of a cargo moving machine coupling mechanism according to one exemplary embodiment of the invention.

FIG. 41 is a close up view of a second end of a cargo moving machine coupling mechanism according to one exemplary embodiment of the invention.

FIG. 42 is a rear view of the cargo area that illustrates the two ends of the cargo moving machine coupling mechanism of FIG. 41 and FIG. 42 fully engaged according to one exemplary embodiment of the invention.

FIG. 43 is a close up, rear view of the cargo area that illustrates the bottom portion that comprises a receptacle region for receiving a portion of the cargo moving machine according to one exemplary embodiment of the invention.

DETAILED DESCRIPTION OF EXEMPLARY EMBODIMENTS

Figures 1, 2:
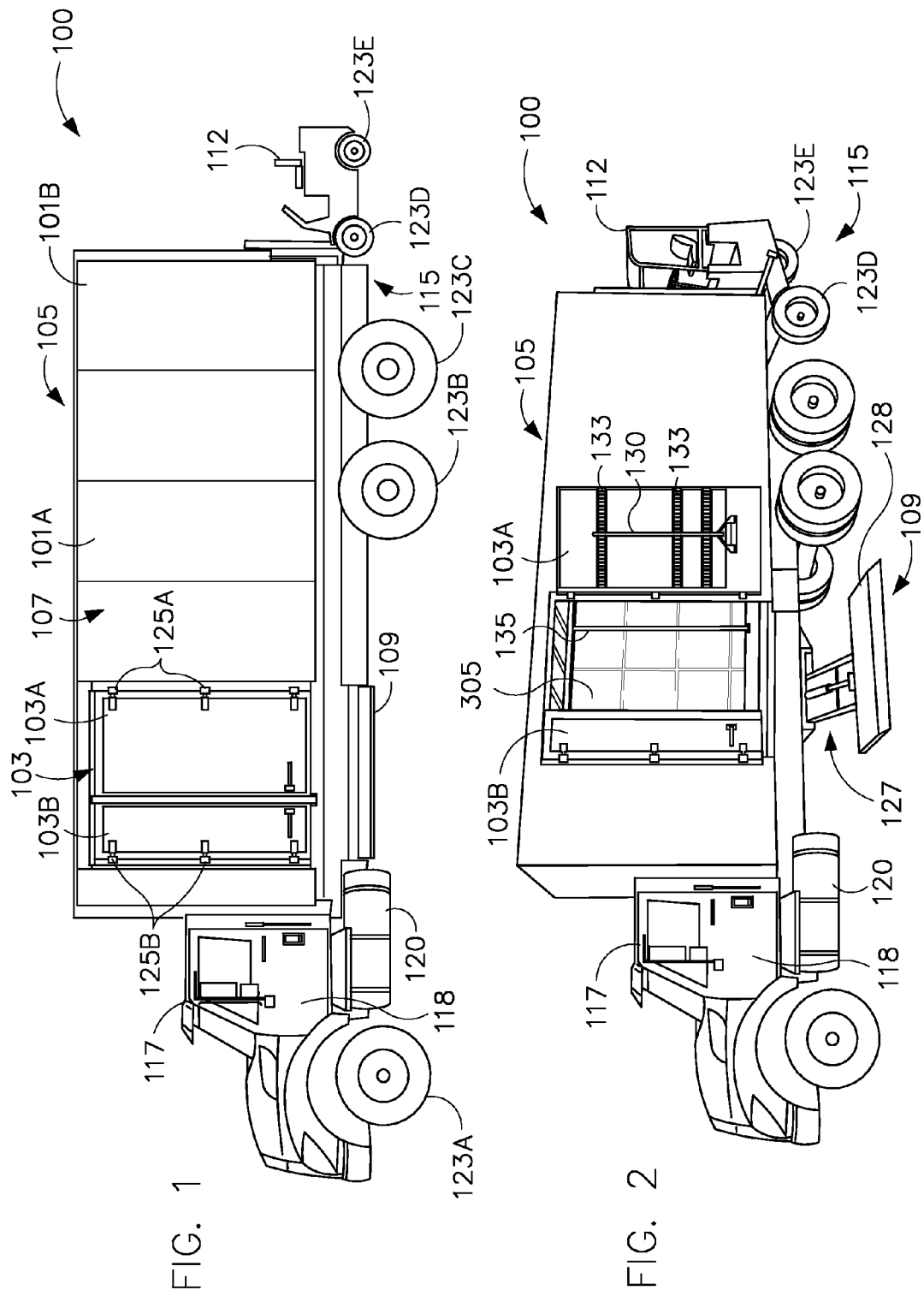
FIG. 1 is a side view of a system including a motor vehicle with a side of its cargo area comprising a door and a side mount liftgate in a raised position according to one exemplary embodiment of the invention.
FIG. 2 is a perspective, side view of the system including a motor vehicle illustrated in FIG. 1 with the side mount liftgate in a lowered position according to one exemplary embodiment of the invention.

Referring now to the Figures, in which like reference numerals designate like parts, FIG. 1 illustrates a side view of a system 100 that comprises a motor vehicle 117 with a side of its cargo area 105 comprising a door 103 and a side mount liftgate 109 in a raised position according to one exemplary embodiment of the invention. The motor vehicle 117 can comprise a truck having a tractor portion which may enclose controls for steering the motor vehicle 117.

The tractor portion may also include a motor for pulling the cargo area 105. The tractor portion of the motor vehicle 117 may also have door 118 which allows access to the tractor portion containing the steering controls of the embodiment illustrated in FIG. 1. However, the invention is not limited to motor vehicles 117 comprising trucks. The invention can include other types of motor vehicles 117, such as, but not limited to, freight cars pulled by locomotives (trains), ships, planes, tractor trailers (i.e.—known in the U.S. as "eighteen wheelers") and the like.

The invention also may exclude the motor vehicle 117 and may only be defined by the cargo area 105. In such exemplary embodiments, the cargo area 105 could be used for shipping containers that are typically carried by ships and/or tractor trailers for transporting movable goods. Further, in such embodiments, the cargo area 105 may be detachable from the motor vehicle without departing from the scope of the invention. The cargo area 105 may generally comprise and define a rectilinear shaped volume. However, the method and system are not limited to a rectilinear shaped cargo area 105 and can include other shapes, such as, square, oval, cylindrical, etc.

The motor vehicle 117 in the exemplary embodiment illustrated in FIG. 1 may comprise a first set of wheels 123A used for steering the vehicle 117 and a second set of wheels 123B, 123C that support the cargo area 105. The motor vehicle 117 may also comprise a fuel container 120 which comprises the fuel needed to power the motor vehicle 117. In the exemplary embodiment illustrated in FIG. 1, the fuel container 120 may comprise diesel fuel to power the tractor portion of the motor vehicle 117.

The cargo area 105 of the system 100 may further comprise a solid wall 107 that is made from a plurality of interconnected panels 101A, 101B. The panels 101A, 101B may be made from metal, however, other materials may be used without departing from the invention. That is, the panels 101A, 101B may be made from polymers, ceramics, glass, or natural elements like wood. According to another illustrative embodiment, instead of interconnected panels 101A, 101B, the solid wall 107 could be constructed from a single, planar sheet of material, like metal.

The door 103 contained within the solid wall 107 may comprise two movable sections 103A, 103B. The first movable section 103A can comprise a first sub-door that can open and rotate relative to a first set of hinges 125A. The second movable section 103B of the door 103 can comprise a second sub-door that can open and rotate relative to a second set of hinges 125B. The first sub-door 103A may be smaller in surface area relative to the second sub-door 103B. However, other sizes of the sub-doors 103A, 103B are included within the scope of the invention. For example, the sub-doors 103A, 103B may be equally sized or the first sub-door 103A may be made larger relative to the second sub-door 103B. Alternatively, the door 103 can be made from a single panel of material which moves on only one set of hinges 125 without departing from the invention.

While the door 103 is illustrated with a rectangular shape, other shapes may be used for the door 103 without departing from the inventive system. Other shapes include, but are not limited to, other polygonal shapes such as generally rectangular shapes with rounded edges, square shapes, elliptical shapes, round shapes, and other like shapes.

The cargo area 105 may comprise a rear portion 115 and adjacent to the rear portion 115 a cargo moving machine 112 may be secured. The cargo moving machine 112 may comprise a forklift, however, other cargo moving machines 112 are within the scope of the invention. Other cargo moving machines can include, but are not limited to, dollies, pallet jacks, reach trucks, stackers, hand carts, and other like cargo moving machines. In the exemplary embodiment illustrated in FIG. 1, the cargo moving machine 112 may comprise two front wheels 123D and a single rear wheel 123E.

Referring now to FIG. 2, this figure illustrates a perspective, side view of the system 100 which includes the motor vehicle 117 illustrated in FIG. 1 with the side mount liftgate 109 in a lowered position according to one exemplary embodiment of the invention. The side mount liftgate 109 can comprise a powering system 127 that has hydraulics for raising and lowering a platform 128 of the liftgate 109. The side mount liftgate 109 can comprise other types of powering systems 127 instead of the hydraulic type. For example, the powering system could comprise an electric motor for driving chains/cables and/or pulleys. The side mount liftgate 109 may be referred to in the industry as a side loader type. Other types of liftgates 109 within the scope of the invention, include, but are not limited to, flipaway types, rail-types, slide away types, level lift types, conventional types, and other like liftgates.

In the exemplary embodiment illustrated in FIG. 2, the first sub-door 103A is in an open position exposing a hand tool 130 that be supported by hanging devices 133. The hand tool 130 depicted comprises a broom, but other hand tools besides brooms, may be stored on an internal side of the sub-door 103B relative to the cargo area 105. FIG. 2 also provides an internal view of a removable support beam 135 that is positioned adjacent to a flexible curtain 305 of the cargo area 105. Further details of the removable support beam 135 and flexible curtain 305 will be described below.

Figure 3:
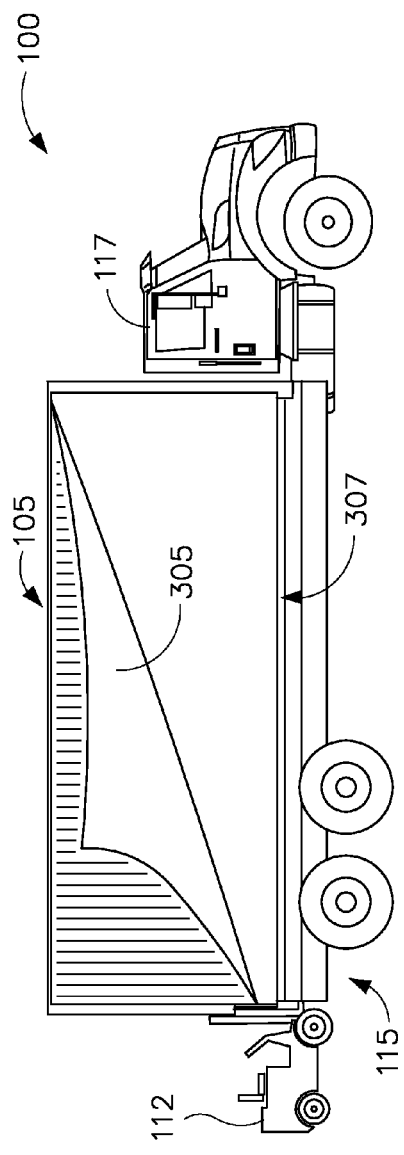
FIG. 3 is a side view of the system including a motor vehicle illustrated in FIG. 1 with a side of the cargo area comprising a flexible curtain in a detached position according to one exemplary embodiment of the invention.

FIG. 3 is a side view of the system 100 including the motor vehicle 117 illustrated in FIG. 1 with a side of the cargo area 105 comprising a flexible curtain 305 in a detached position according to one exemplary embodiment of the invention. The flexible curtain 305 can comprise a flexible polyvinyl-chloride (PVC)-coated, woven polyester fabric. Such curtains 305 as of this writing are available from All Van Corporation of LaVergne, Tenn. However, the flexible curtain 305 can comprise other industrial fabrics besides PVC-coated, woven polyester fabric. Other industrial fabrics, include, but are not limited to, coated or un-coated, vinyl, polypropylene, canvas, mesh fabrics, and the like. The curtain 305 may be detachable from a floor portion 307 of the cargo area 105.

The curtain 305 may be slidably as well as removably attached to a roof portion 309 of the cargo area. The curtain 305 is generally designed so that it may slide along the roof portion 309 when it is detached from the floor portion 307 of the cargo area 105. In this way, the curtain 305 allows full access to the cargo area 105 compared to the partial access that is provided by a rear door and the side door 103 on the opposing side of the cargo area 105.

Figure 4:
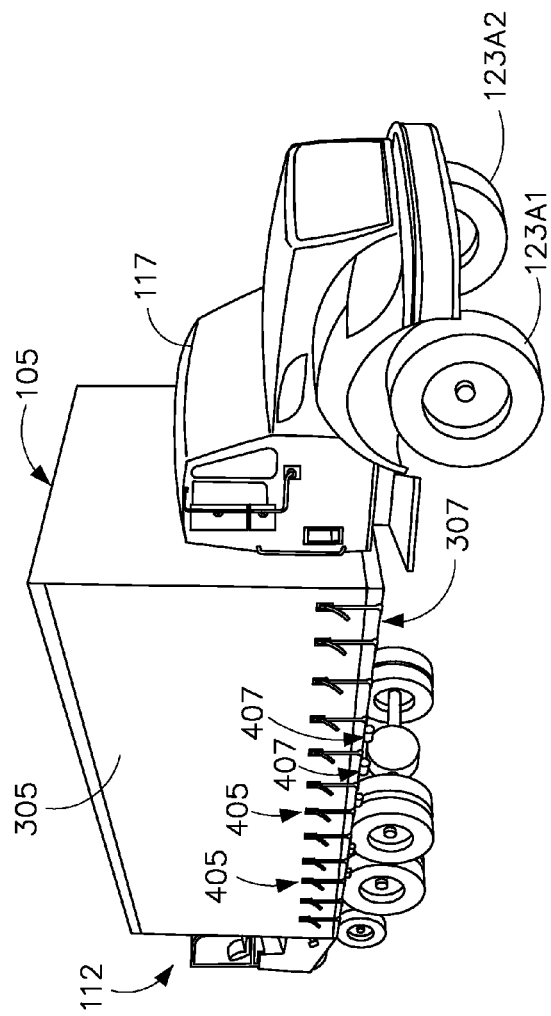
FIG. 4 is a perspective, side view of the system including a motor vehicle illustrated in FIG. 1 with the flexible curtain in a attached position according to one exemplary embodiment of the invention.

Referring now to FIG. 4, this figure illustrates a perspective, side view of system 100 comprising the motor vehicle 117 illustrated in FIG. 1 with the flexible curtain 305 in a attached position according to one exemplary embodiment of the invention. The curtain 305 is attached to the floor portion 307 of the cargo area by fastening mechanisms 405. The fastening mechanisms 405 can comprise positive latching quick release stainless steel buckles in combination with nylon straps. These buckles and straps as of this writing are available from All Van Corporation of LaVergne, Tenn. However, other fastening mechanisms 405 may be used without departing from the invention. For example other fastening mechanisms 405 may include, but are not limited to, snaps, detachable rivets, hook and loop fasteners, bungee cords coupled to anchors, and other like fastening mechanisms.

In addition to the fastening mechanisms 405 illustrated in FIG. 4, a plurality of cargo securing mechanisms 407 are also illustrated. The cargo securing mechanisms 407 are fixedly attached to the floor portion 307 of the cargo area 105. The cargo securing mechanisms 407 can help hold any goods placed in the cargo area 105. These cargo securing mechanisms 407 can comprise straps supported by tie-down winches. The straps and winches as of this writing are available from U.S. Cargo Control, Inc. of Urbana, Iowa. Further details of the cargo securing mechanisms 407 will be described below.

Figure 5:
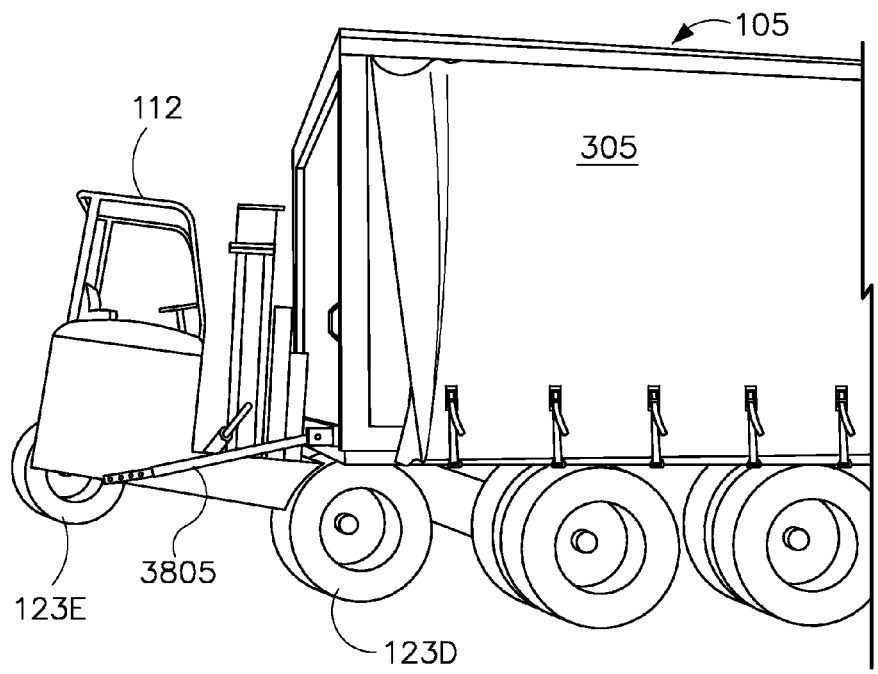
FIG. 5 is a rear, side view the cargo area illustrated in FIG. 1 with the flexible curtain partially detached and further illustrating a cargo moving machine in a secured position according to one exemplary embodiment of the invention.

Referring now to FIG. 5, this figure illustrates a rear, side view of the cargo area 105 illustrated in FIG. 1 with the flexible curtain 305 partially detached and further illustrating a cargo moving machine 112 in a secured position according to one exemplary embodiment of the invention. As noted previously above, the cargo moving machine 112 may comprise a forklift, however, other cargo moving machines 112 are within the scope of the invention. Other cargo moving machines can include, but are not limited to, dollies, pallet jacks, reach trucks, stackers, hand carts, and other like cargo moving machines. The cargo moving machine 112 may be secured to the rear portion of the cargo area 105 by a cargo moving machine coupling mechanism 3805. Further details of this coupler 3805 will be described below.

Figure 6:
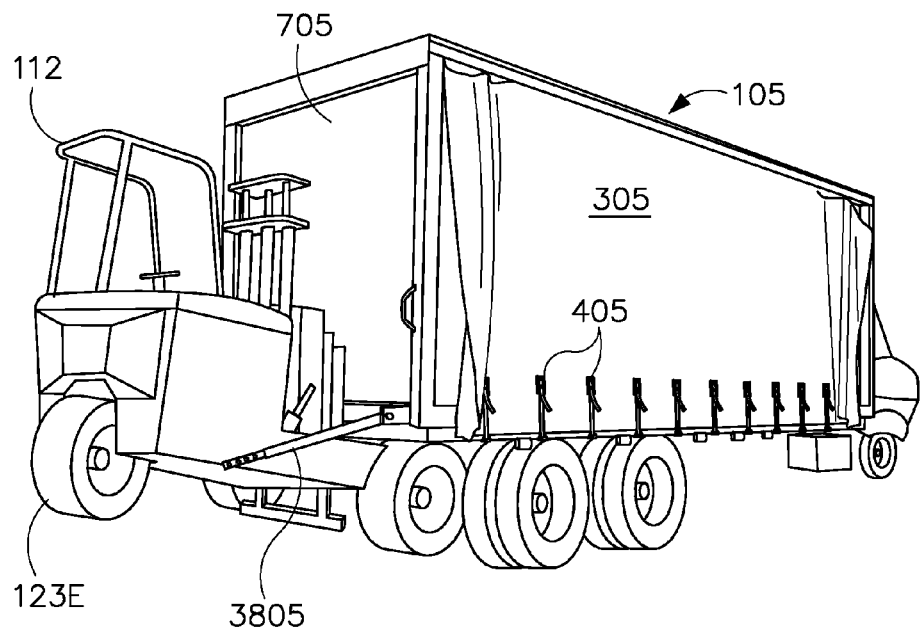
FIG. 6 is a rear, perspective view of cargo area illustrated in FIG. 1 with the flexible curtain partially detached and with the cargo moving machine in a secured position according to one exemplary embodiment of the invention.

Referring now to FIG. 6, this figure illustrates a rear, perspective view of the cargo area 105 illustrated in FIG. 1 with the flexible curtain 305 partially detached and with the cargo moving machine 112 in a secured position according to one exemplary embodiment of the invention. The cargo moving machine 112 is held in its secured position by coupler 3805. Coupler 3805 may comprise a chain with special ends according to an exemplary embodiment of the invention. Further details of the coupler 3805 will be illustrated and discussed in further detail below. Also illustrated is a rear rolling door 705 which will be further illustrated and described in detail below.

Referring now to FIG. 7, this figure is a full rear view of the cargo area 105 illustrated in FIG. 1 with the cargo moving machine 112 in a secured position according to one exemplary embodiment of the invention. As shown in this figure, and FIG. 5 and FIG. 6, the cargo moving machine 112 is designed such that its wheels 123D, 123E will not contact the ground when the cargo moving machine 112 is in the secured position. In this way, the cargo moving machine 112 will only contribute to weight of the cargo area 105 without contributing to any excess frictional drag and/or losses in maneuverability of the cargo area 105. However, other designs which may include a cargo moving machine 112 dragged behind the cargo area 105 in which the wheels 123D, 123E of the cargo moving machine 112 contact the ground are within the scope of the invention.

Also illustrated in FIG. 7 is a door 705 in a closed or fully extended position. The door 705 may comprise one that is a rolling type that rolls along tracks. However, other types of rear doors 705 are within the scope of the invention. Other types of rear doors 705 include, but are not limited to, doors with side-mounted hinges, doors with hinges near a roof section 309 of the cargo area 105, and other like doors 705.

Referring now to FIG. 8, this figure is perspective, rear view of the cargo area 105 illustrated in FIG. 1 with the cargo moving machine 112 removed from the motor vehicle 117 and further illustrating a rear rolling door 705 in an elevated position and the flexible curtain 305 in a partially open position according to one exemplary embodiment of the invention. The cargo moving machine 112 can access the internal space or volume defined by the cargo area 105 through either the space defined by the elevated rolling door 705 or through the opening defined by the partially opened curtain 305.

Referring now to FIG. 9, this figure is a perspective, side view of the cargo area 105 illustrated in FIG. 1 with the flexible curtain 305 in an open position, the rear rolling door 705 in a closed position, and with a removable beam 135 in a secured position according to one exemplary embodiment of the invention. Further details of the removable beam 135 will be illustrated and described in further detail below. The rolling door 705 is supported by a track 905 that engages rollers or wheels of the door 705.

FIG. 9 further illustrates a roof 907 of the cargo area 105. The roof 907 may comprise a planar, metal sheet. However, other materials for the roof 907 are not beyond the scope of the invention. Other materials for the roof 907 include, but are not limited to, polymers, ceramics, glass, or natural elements like wood. The roof 907 may be supported by beams 909. The beams 909, like the roof 907, may be made from metal, such as aluminum. However, the beams 909 may comprise other materials like the roof as noted above.

FIG. 9 also illustrates further details of the inside portion of the side wall 107 for the cargo area 105. The inside portion of the side wall 107 may comprise a plurality of hanging devices 133, similar to the ones placed on the door 103 illustrated in FIG. 2 above. These hanging devices 133 can secure tools as well as cargo within the cargo area 105.

Further details of the floor portion 307 of the cargo area 105 are illustrated in FIG. 9. The floor portion 307 may be made from metal such as steel. The floor portion 307 may be reinforced and further supported by beams, similar to the beams 909 for the roof portion 907. The floor portion 307 of the cargo area 105 is generally thicker relative to the roof portion 907. Other materials for the floor 307 are not beyond the scope of the invention. Other materials for the floor 307 include, but are not limited to, polymers, ceramics, glass, or natural elements like wood.

Referring now to FIG. 10, this figure is a side view of the system 100 comprising the motor vehicle 117 illustrated in FIG. 1 but with the flexible curtain 305 not illustrated and with exemplary goods 1005, 1010 which may be transported in the cargo area 105 according to one exemplary embodiment of the invention. The consumer goods 1010 that are positioned nearest to the motor vehicle 117 usually need protection from environmental elements. These goods 1010 can include, but are not limited to, appliances like washers, dryers, refrigerators, etc. To load and unload these type of consumer goods, the side mount liftgate 109 adjacent to door 103 can be used.

The consumer goods 1005 that are positioned furthest from the motor vehicle 117 usually do not need protection from environmental elements. These consumer goods 1005 can include, but are not limited to, building materials, like cement, bricks, and lumber. While the first set of consumer goods 1010 have been positioned adjacent to the door 103 with the side-mound liftgate 109, these goods 1010 can be positioned anywhere in the cargo area 105 such as in the position of the second set of goods 1005. The second set of goods can also be positioned anywhere in the cargo area 105.

Referring now to FIG. 11, this figure is a functional block diagram illustrating an elevational or top view of the system 100 that includes the motor vehicle 117 illustrated in FIG. 1 according to one exemplary embodiment of the invention. This figure illustrates the relative position of the system elements such as the roof 907; the rear rolling door 705; the cargo moving machine 112; the curtain side 305; a solid side 1105 adjacent to the motor vehicle 117; and the solid side 107 containing the door 103. As noted above, cargo area 105 may generally comprise and define a rectilinear shaped volume. However, the method and system are not limited to a rectilinear shaped cargo area 105 and can include other shapes, such as, square, oval, cylindrical, etc. For example, if the cargo area 105 has a generally cylindrical shape, then one side of the cylinder could comprise a curtain side 305 and one of the two ends could comprise a door. Additional shapes and configurations of the cargo area 105 are not beyond the scope of the invention.

FIG. 12 is an internal view of the cargo area of the system 100 illustrated in FIG. 1 with the removable beam 135 in a secured position and the flexible curtain 305 in a fully extended and secured position according to one exemplary embodiment of the invention. The removable beam 135 can be made from materials such as metal. But other materials are within the scope of the invention. Other materials include, but are not limited to, polymers, ceramics, glass, or natural elements like wood.

The removable beam 135 can provide additional support for the roof 907 as well as the curtain 305. However, this additional support is not that critical and therefore, if the removable beam 135 restricts the loading and/or unloading of oversized cargo, then it can be removed from its central position along the curtain 305. The removable beam 135 can be fastened to a roof beam 1215 with a sliding hinge assembly 1205. However, other hardware for attaching the top portion of the removable beam 135 to the roof beam 1215 can be used without departing from the invention.

The removable beam 135 can be attached to the floor 307 of the cargo area 105 by inserting the beam 135 in an aperture or hole 1210 within the floor 307. However, other hardware for fastening the beam 135 to the floor 307 can be used without departing from the scope of invention.

FIG. 13 is an internal view of the cargo area 105 illustrated in FIG. 1 and that further illustrates a first end of the removable beam and how it is coupled to the roof 907 of the cargo area with a hinge assembly 1205 according to one exemplary embodiment of the invention. The hinge assembly 1205 can comprise hinges 1215 that are coupled to a track 1217A so that the hinges 1215 can slide along the track 1215. The end of the beam 135 coupled to the hinge 1215 comprises a pin 1220. As noted above, the system is not limited to this form of attachment to the roof 907. Other mechanical configurations for coupling the removable beam 135 to the roof 907 are within the scope of the invention.

Referring now to FIG. 14, this figure is an internal view of the cargo area 105 of the system 100 illustrated in FIG. 1 which also illustrates a second end of the removable beam 135 and how it is coupled to a floor 307 of the cargo area 105 via an aperture 1210 according to one exemplary embodiment of the invention. A portion of the removable beam 135 may slide into the aperture 1210 to lock the beam 135 into position. This view further illustrates a handle 1405, a locking mechanism 1408, and a pivot pin 1411. Further details of the locking mechanism 1408 and pivot pin 1411 will be described below.

Referring now to FIG. 15, this figure is a side view of the removable beam 135 that illustrates the locking mechanism 1408 for the beam 135 in a locked position according to one exemplary embodiment of the invention. The locking mechanism 1408 can comprise a locking ring 1505 with a slot 1507. The locking mechanism 1408 is designed to enclose and surround an end of the pivotal portion 1413 of the removable beam 135 so that the end cannot move relative to the beam 135 when the locking ring 1505 of the locking mechanism 1408 is engaged with the pivotal portion 1413. The slot 1507 of the locking ring 1505 is designed to engage a pin 1510 when the locking mechanism 1408 is in an unlocked position. Further details and operation of the locking mechanism 1408 in conjunction with the removable beam 135 are illustrated and described in further detail below.

Figure 16:
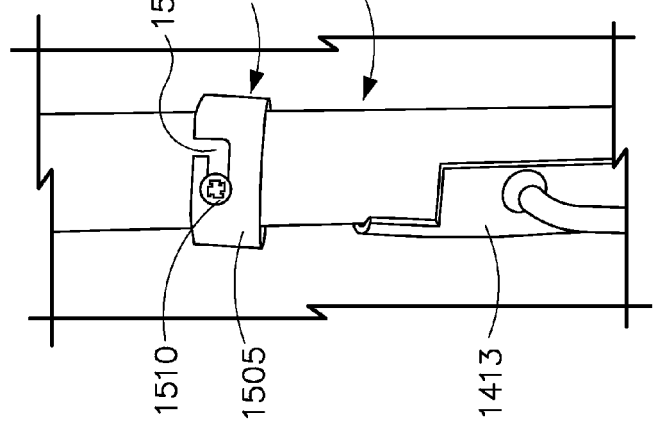
FIG. 16 is a side view of the removable beam that illustrates a locking mechanism for the beam in an unlocked position according to one exemplary embodiment of the invention.

Referring now to FIG. 16, this figure is a side view of the removable beam 135 that illustrates the locking mechanism 1408 for the beam 135 in an unlocked position according to one exemplary embodiment of the invention. In this view, the locking ring 1505 of the locking mechanism 1408 is secured to a pin 1510. The pin 1510 can comprise a screw, but other pins, such as solid types welded to the beam 135 are not beyond the invention. The pin 1510 slidably engages the slot 1507 of the locking ring 1505 to hold the locking ring 1505 above the pivotable portion 1413 of the beam 135.

Figure 17:
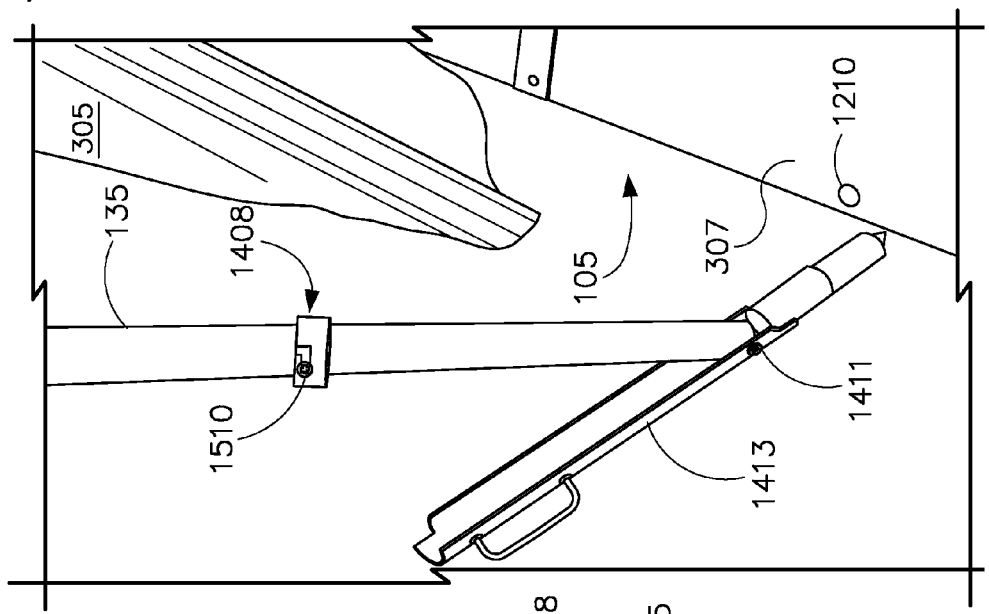
FIG. 17 is a side view of the removable beam that illustrates a locking mechanism for the beam in an unlocked position and with the removable beam separated from the floor of the cargo area according to one exemplary embodiment of the invention.

Referring now to FIG. 17, this figure is a side view of the removable beam 135 that illustrates the locking mechanism 1408 for the beam 135 in an unlocked position and with the removable beam 135 separated from the floor 307 of the cargo area 105 according to one exemplary embodiment of the invention. With the pin 1510 holding the slot 1507 of the locking ring 1505 so that the locking ring 1505 is separated from the pivotal portion 1413 of the beam 135, the pivotable portion 1413 can rotate about the pivot pin 1411 so that an end of the pivotal portion 1413 can be removed from the aperture 1210 in the floor 307.

Figure 18:
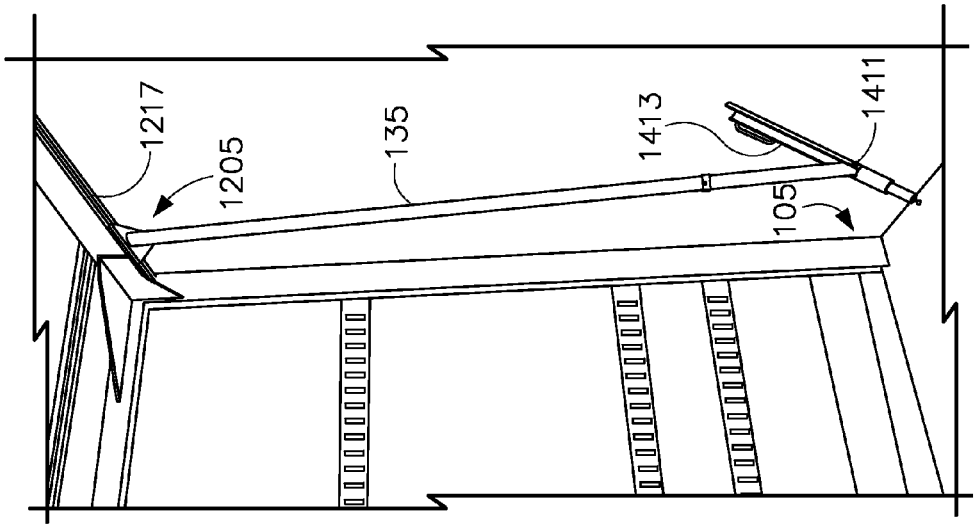
FIG. 18 is a side view of the removable beam that illustrates a locking mechanism for the beam in an unlocked position with the removable beam separated from the floor of the cargo area and positioned along its track adjacent to a front portion of the cargo area according to one exemplary embodiment of the invention.

Referring now to FIG. 18, this figure is a side view of the removable beam 135 that illustrates the locking mechanism 1408 for the beam 135 in an unlocked position with the removable beam 135 separated from the floor 307 of the cargo area 105 and positioned along its track 1217 adjacent to a front portion 1105 of the cargo area 105 according to one exemplary embodiment of the invention. With the pivotable portion 1413 of the beam 135 disengaged from the aperture 1210 in the floor 307, the beam 135 can slide along its track 1217 so that the beam 135 can be moved out of the way of oversized cargo that can be loaded and unloaded from the cargo area 105.

Figure 19A:
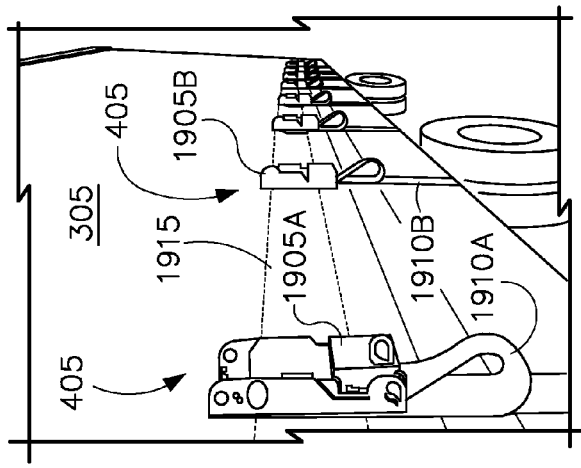
FIG. 19A is a perspective, side view of the system illustrated in FIG. 1 with the flexible curtain in a secured, closed position and further illustrating the fastening mechanisms for the flexible curtain in more detail according to one exemplary embodiment of the invention.

FIG. 19A is a perspective, side view of the system illustrated in FIG. 1 with the flexible curtain 305 in a secured, closed position and further illustrating the fastening mechanisms 405 for the flexible curtain 305 in more detail according to one exemplary embodiment of the invention. The fastening mechanisms 405 can comprise stainless steel buckles 1905 and nylon straps 1910. As noted above, these buckles 1905 and straps 1910 as of this writing are available from All Van Corporation of LaVergne, Tenn. However, other fastening mechanisms 405 may be used without departing from the invention. For example other fastening mechanisms 405 may include, but are not limited to, snaps, detachable rivets, hook and loop fasteners, bungee cords coupled to anchors, and other like fastening mechanisms. Also illustrated with dashed lines in FIG. 19A is a beam 1915 to indicate that it is hidden in this view. Further details of the beam 1915 will be described below in connection with FIG. 19B.

Figure 19B:
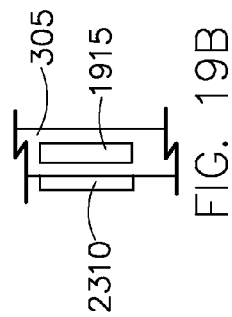
FIG. 19B illustrates a cross sectional view of multiple beams contained or encapsulated by the curtain along a length of the curtain according to one exemplary embodiment of the invention.

FIG. 19B illustrates a cross sectional view of multiple beams 1915 contained or encapsulated by the curtain 305 along a length of the curtain according to one exemplary embodiment of the invention. Each beam 1915 may comprise a rectangular prism. Each beam 1915 may be made from metal, but other materials are within the scope of the invention. Other materials for the beam 1915 include, but are not limited to, polymers, ceramics, glass, or natural elements like wood. Each beam 1915 may have a length that is defined by the distance between two fastening mechanism 405 as illustrated in FIG. 19A. FIG. 19B also illustrates a cross sectional view of a rectangular shaped reinforcement strap 2310 positioned on an inside section of the curtain 305. Further details of this reinforcement strap 2310 will be described below.

Figure 20:
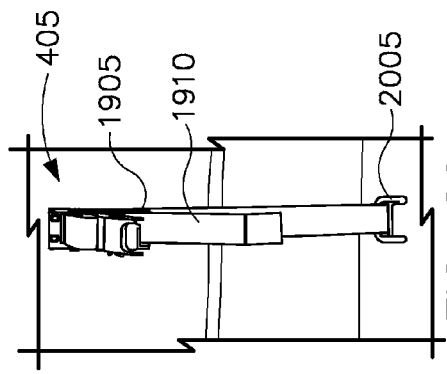
FIG. 20 is a close up view of a fastening mechanism in a detached position for the flexible curtain according to one exemplary embodiment of the invention.

Referring now to FIG. 20, this figure is a close up view of a fastening mechanism 405 in a detached position for the flexible curtain 305 according to one exemplary embodiment of the invention. In this view, the buckle 1905 is in an unlatched position while another end of the strap 1910 which comprises a hook 2005 is not engaged with a floor portion 307 of the cargo area 105.

Figure 21:
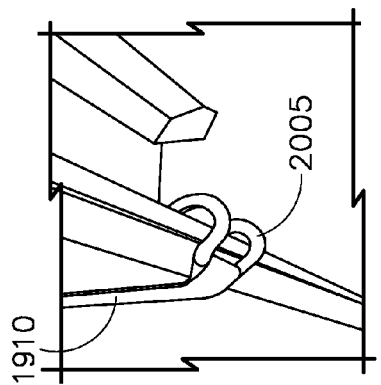
FIG. 21 is a close up view of an end of the fastening mechanism in a secured position for the flexible curtain according to one exemplary embodiment of the invention.

Referring now to FIG. 21, this figure is a close up view of an end of the fastening mechanism 405 in a secured position for the flexible curtain 305 according to one exemplary embodiment of the invention. This view illustrates the hook 2005 of the fastening mechanism 405 engaged with a portion of the floor 307 so that the curtain 305 is held in a secured position.

Figure 22:
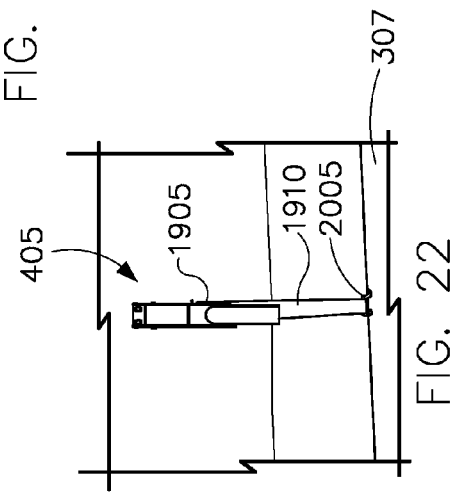
FIG. 22 is a close up view of a fastening mechanism in a secured position for the flexible curtain according to one exemplary embodiment of the invention.

Referring now to FIG. 22, this figure is a close up view of a fastening mechanism 405 in a secured position for the flexible curtain 305 according to one exemplary embodiment of the invention. This view illustrates the buckles 1905 and hooks 2005 in a secured or locked position so that the curtain 305 is secured to the floor portion 307 of the cargo area 105.

Figure 23:
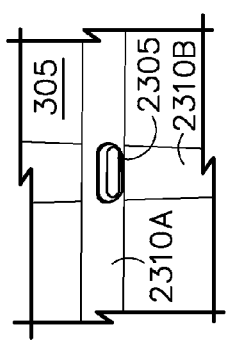
FIG. 23 is a close up, top view of a mounting mechanism positioned on a side of the flexible curtain opposite to a fastening mechanism for attaching the fastening mechanism to the flexible curtain according to one exemplary embodiment of the invention.

Referring now to FIG. 23, this figure is a close up, top view of a mounting mechanism 2305 positioned on a side of the flexible curtain 305 opposite to a fastening mechanism 405 for attaching the fastening mechanism 405 to the flexible curtain 305 according to one exemplary embodiment of the invention. The mounting mechanism 2305 can comprise a block of material, such as plastic, which may receive coupling mechanisms, like rivets or screws, that secure the buckles 1905 to the curtain 305. The mounting mechanism 2305 can comprise other materials, such as metal, without departing from the invention.

The mounting mechanisms 2305 can be placed at an intersection between two rectangular support straps 2310A, 2310B which reinforce the curtain 305. Several rectangular reinforcement straps 2310A, 2310B can be positioned along the length and width of the curtain 305 in order to form various rectangular shaped panels as illustrated in FIG. 28 described below.

Figure 24:
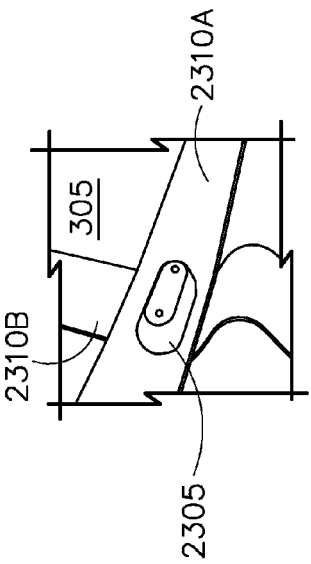
FIG. 24 is a perspective, close up, view of the mounting mechanism illustrated in FIG. 23 according to one exemplary embodiment of the invention.

Referring now to FIG. 24, this figure is a perspective, close up, view of the mounting mechanism 2305 illustrated in FIG. 23 according to one exemplary embodiment of the invention. The mounting mechanism 2305 may comprise a thickness that is greater than the length of the coupling mechanisms, such as rivets, that may be used to couple the buckles 1905 to the curtain 305. In this way, the coupling mechanisms for the buckles 1905 are not exposed and may maintain a tight engagement of the mounting mechanism 2305 against the curtain 305.

Referring now to FIG. 25, this figure is side view of a slider coupler 2505 which connects the flexible curtain 305 to a roof 907 of the cargo area 105 according to one exemplary embodiment of the invention. The slider coupler 2505 can comprise a roller 2507 contained by a second track 1217B adjacent to the first track 1217A. The first track 1217A contains the hinge 1215 for the removable beam 135 as noted above. The roller 2507 can be made from nylon, however, other materials are not beyond the scope of the invention. The roller 2507 can also comprise a ball-bearing type roller. A ring 2509 can be coupled to a central region of the roller 2507. The ring 2509 can be made from metal, but other materials could be used. The ring 2509 supports a strap 2511 that is also coupled to the curtain 305. The strap 2511 is coupled to the curtain 305 with a fastener 2513, which can comprise a bolt. Other fasteners, like screws or rivets, could be used without departing from the invention.

The slider coupler 2505 and its related subcomponents describe above as of this writing are available from All Van Corporation of LaVergne, Tenn. However, other slider couplers 2505 may be used without departing from the invention.

Referring now to FIG. 26, this figure is a side view of the slider coupler 2505 of FIG. 25 with the flexible curtain 305 in a retracted position according to one exemplary embodiment of the invention. This view illustrates the slider coupler 2505 in more detail. Specifically, another end of the fastener 2513 is illustrated and the two separate tracks 1217A, 1217B are more clearly defined in which the first track 1217A may contain the hinge 1215 of the movable beam 135 and in which the second track 1217B may contain the roller 2507 of the slider coupler 2505 for the curtain 305.

Referring now to FIG. 27, this figure is a perspective, side view of the slider coupler 2505 of FIG. 26 according to one exemplary embodiment of the invention. This view further illustrates the strap 2511/curtain 305 interface in which the fastener 2513 secures the strap 2511 to the curtain 305.

Referring now to FIG. 28, this figure is an internal view of the flexible curtain 305 relative to the cargo area 105 and which further illustrates rectangular shaped support straps 2310 along a surface of the flexible curtain 305 according to one exemplary embodiment of the invention. As noted previously, the curtain 305 as of this writing is available from All Van Corporation of LaVergne, Tenn. The criss-crossing reinforcement straps 2310 intersect with one another to define rectangular shaped panels 2805. The invention is not limited to the number and placement of the straps shown. Additional or fewer straps 2310 than the number illustrated could be employed without departing from the scope of the invention.

Figure 29:
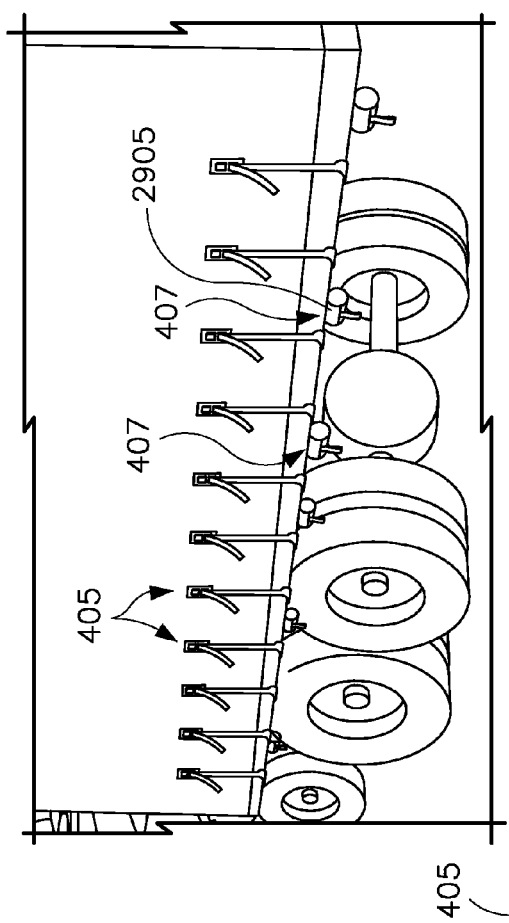
FIG. 29 is a perspective, side view of the system illustrated in FIG. 1 with the flexible curtain in a attached position and which further illustrates cargo securing mechanisms according to one exemplary embodiment of the invention.

Referring now to FIG. 29, this figure is a perspective, side view of the system illustrated in FIG. 1 with the flexible curtain 305 in a attached position and which further illustrates cargo securing mechanisms 407 according to one exemplary embodiment of the invention. The cargo securing mechanisms 407 can comprise a nylon strap 2905 that can be wrapped upon itself into a cylindrical shape. Further details of the cargo securing mechanisms 407 are illustrated and described in further detail below.

Figure 30:
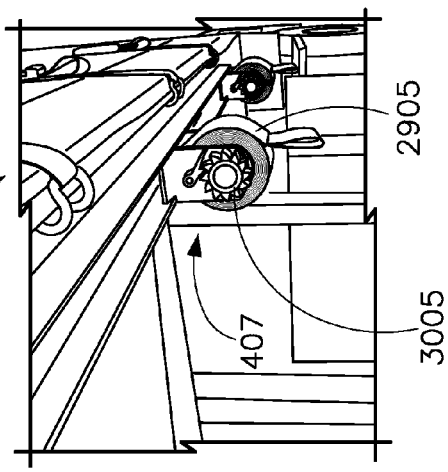
FIG. 30 is a perspective, bottom view of the system illustrated in FIG. 1 with the flexible curtain in a attached position and which further illustrates cargo securing mechanisms and the fastening mechanisms in a secured position according to one exemplary embodiment of the invention.

Referring now to FIG. 30, this figure is a perspective, bottom view of the system 100 illustrated in FIG. 1 with the flexible curtain 305 in a attached position and which further illustrates cargo securing mechanisms 407 and the fastening mechanisms 405 in a secured position according to one exemplary embodiment of the invention. These cargo securing mechanisms 407 can comprise straps 2805 supported by tie-down winches 3005. The straps 2805 and winches 3005 as of this writing are available from U.S. Cargo Control, Inc. of Urbana, Iowa.

Figure 31:
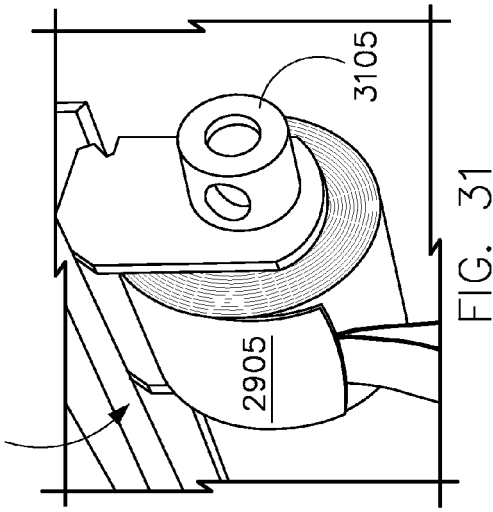
FIG. 31 is a close up view of a cargo securing device according to one exemplary embodiment of the invention.

Referring now to FIG. 31, this figure is a close up view of a cargo securing mechanism 407 according to one exemplary embodiment of the invention. This view illustrates a side opposite to the side of the winch 3005 illustrated in FIG. 30. The mechanism 407 has a receptacle 3105 for receiving a winch turning device, such as a solid, metal rod.

Figure 32:
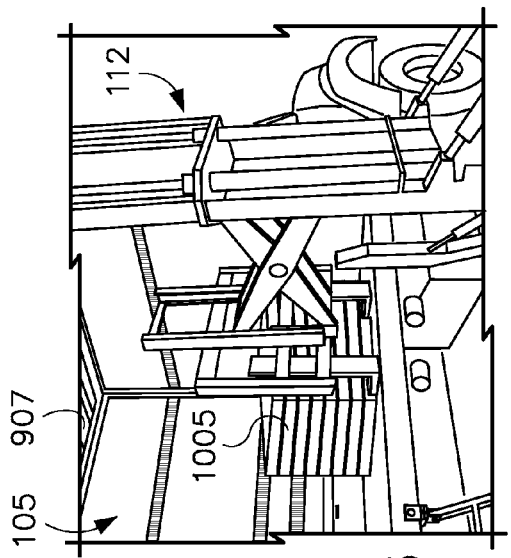
FIG. 32 is a side view of the cargo area with the flexible curtain in a retracted position and with a ladder to the cargo area in an extended position and the removable beam in a secured position according to one exemplary embodiment of the invention.
Figure 33:
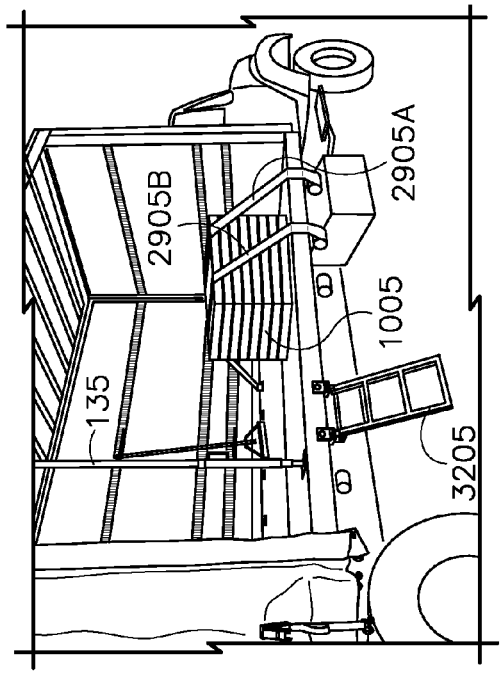
FIG. 33 is a side view of the cargo area with the flexible curtain in a retracted position and the cargo moving machine lowering goods in the cargo area according to one exemplary embodiment of the invention.

Referring now to FIG. 32, this figure is a side view of the cargo area 105 with the flexible curtain 305 in a retracted position and with a ladder 3205 to the cargo area 105 in an extended position and the removable beam 135 in a secured position according to one exemplary embodiment of the invention. FIG. 33 is a side view of the cargo area 105 with the flexible curtain 305 in a retracted position and the cargo moving machine 112 lowering goods 1005 in the cargo 105 area according to one exemplary embodiment of the invention. These goods 1005 can comprise the type that do not need protection from environmental elements, like the weather.

Figure 34:
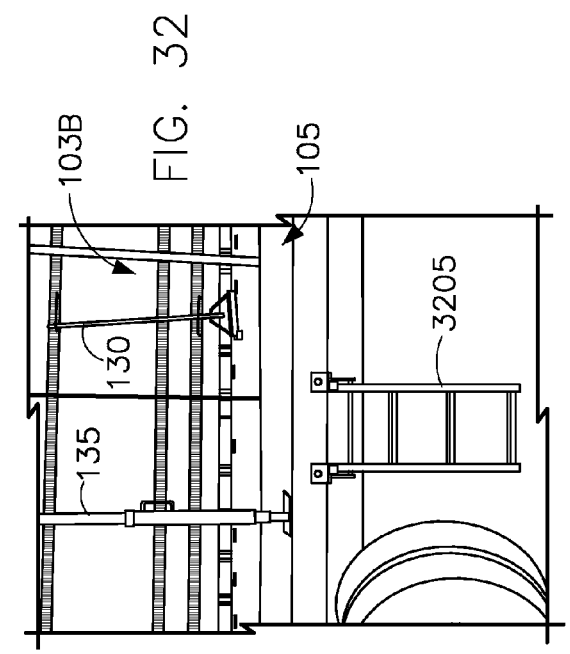
FIG. 34 is a side view of the cargo area with the flexible curtain in a retracted position and goods held in place with the cargo securing mechanisms according to one exemplary embodiment of the invention.
Figure 35:
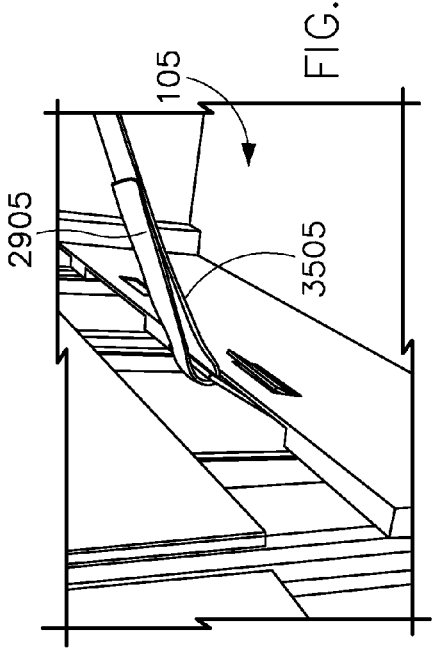
FIG. 35 is a close up view of a cargo securing device illustrated in FIG. 34 having one end fastened to a solid side wall of the cargo area according to one exemplary embodiment of the invention.

Referring now to FIG. 34, this figure is a side view of the cargo area 105 with the flexible curtain 305 in a retracted position and the goods 1005 held in place with the cargo securing mechanisms 407 according to one exemplary embodiment of the invention. FIG. 35 is a close up view of a cargo securing mechanism 407 illustrated in FIG. 34 having one end 3505 fastened to a solid side wall 107 of the cargo area 105 according to one exemplary embodiment of the invention. The one end 3505 fastened to the solid side wall 107 may comprise a flat hook. But other ends 3505 are possible without departing from the scope of the invention. Other ends can include, but are not limited to, round hooks, S-shape hooks, clips, and the like.

FIG. 36 is a rear view of the cargo area 105 with the cargo moving machine 112 being positioned for engaging a bottom portion 3605 of the cargo area 105 according to one exemplary embodiment of the invention. In this exemplary embodiment, the cargo moving machine 112 comprises a forklift having a loading mechanism 3610. The loading mechanism 3610 in this exemplary embodiment comprises a fork. The loading mechanism 3610 is designed for lifting pallets and can also engage a bottom portion 3605 of the cargo area 105. As noted above, the invention is not limited to cargo moving machines 112 comprising forklifts. Other cargo moving machines 112 can include, but are not limited to, dollies, pallet jacks, reach trucks, stackers, hand carts, and other like cargo moving machines. The bottom portion 3605 of the cargo area 105 can be designed to receive a particular cargo moving machine 112. In other words, the geometry and structure of the bottom portion 3605 can be tailored for the specific type loading mechanism 3610 of a cargo moving machine 112 so that the machine 112 can be fastened to the rear portion of the cargo area 105.

Referring now to FIG. 37, this figure is a rear view of the cargo area 105 with the cargo moving machine 112 engaged with a bottom portion 3605 of the cargo area 105 and with the cargo moving machine's wheels 123D, 123E in contact with the ground according to one exemplary embodiment of the invention. This view illustrates how the bottom portion 3605 can be designed to receive the loading mechanism of a particular cargo moving machine 112 so that it may be secured to the cargo area 105.

Referring now to FIG. 38, this figure is a rear view of the cargo area 105 with the cargo moving machine 112 engaged with a bottom portion 3605 of the cargo area 105 and elevated relative to the ground according to one exemplary embodiment of the invention. In this figure, the cargo moving machine 112 activates its loading mechanism 3610 comprising a fork in order to lower the loading mechanism 3610. Because the mass of the cargo area 105 is significantly greater than the mass of the cargo moving machine 112, the lowering motion of the loading mechanism 3610 of the cargo moving machine 112 causes the power system of the loading mechanism 3610 to elevate the cargo moving machine 112 above the ground. FIG. 38 also illustrates a coupling mechanism 3805 for the cargo moving machine in a retracted position.

Referring now to FIG. 39, this figure is a close up, rear view of the cargo area 105 with the cargo moving machine 112 engaged with a bottom portion 3605 of the cargo area 105 according to one exemplary embodiment of the invention. Specifically, this view illustrates how the loading mechanism 3610 engages with the bottom portion 3605 of the cargo area.

Referring now to FIG. 40, this figure is a close up view of a first end 4005 of a cargo moving machine coupling mechanism 3805 according to one exemplary embodiment of the invention. In this exemplary embodiment, the cargo machine coupling mechanism 3805 can comprise a chain. The first end 4005 can comprise a cotter-pin assembly. However, other coupling mechanisms 3805 and ends 4005 are not beyond the scope of the invention. Other coupling mechanisms 3805 and ends 4005 can include, but are not limited to, cables, solid beams, solid plates, bolts, hooks, S-shaped hooks, flat hooks, rings, ropes, and other like coupling mechanisms and ends.

Referring now to FIG. 41, this figure is a close up view of a second end 4105 of a cargo moving machine coupling mechanism 3805 according to one exemplary embodiment of the invention. The second end 4105 can comprise a bolt 4110 and movable plate assembly 4115. The bolt 4110 can be rigidly attached to the cargo moving machine 112 while the plate assembly 4115 can rotate around the bolt. In this way, when the first end 4105 is not engaged with the cargo area 105, the coupling mechanism 3805 can be retracted and positioned so that it does not interfere with operation of the cargo moving machine 112 as illustrated in FIG. 38 discussed above. As noted previously, other ends for the coupling mechanism 3805 are within the scope of the invention.

Referring now to FIG. 42, this figure is a rear view of the cargo area 105 that illustrates the two ends 4005, 4105 of the cargo moving machine coupling mechanism 3805 of FIG. 41 and FIG. 42 fully engaged according to one exemplary embodiment of the invention. In this view, the coupling mechanism 3805 is in a fully extended position to rigidly secure the cargo moving machine 112 to the cargo area 105.

Referring now to FIG. 43, this figure is a close up, rear view of the cargo area 105 that illustrates the bottom portion 3605 that comprises a receptacle region 4305 for receiving a portion of the cargo moving machine 112 according to one exemplary embodiment of the invention. The receptacle region 4305 can receive the loading mechanism 3610 of the cargo moving machine 112. As noted previously, the geometry and structure of the bottom portion 3605 and its receptacle region 4305 may be tailored according to the type of cargo loading machine 112 used for the cargo area 105.

Figure 44:
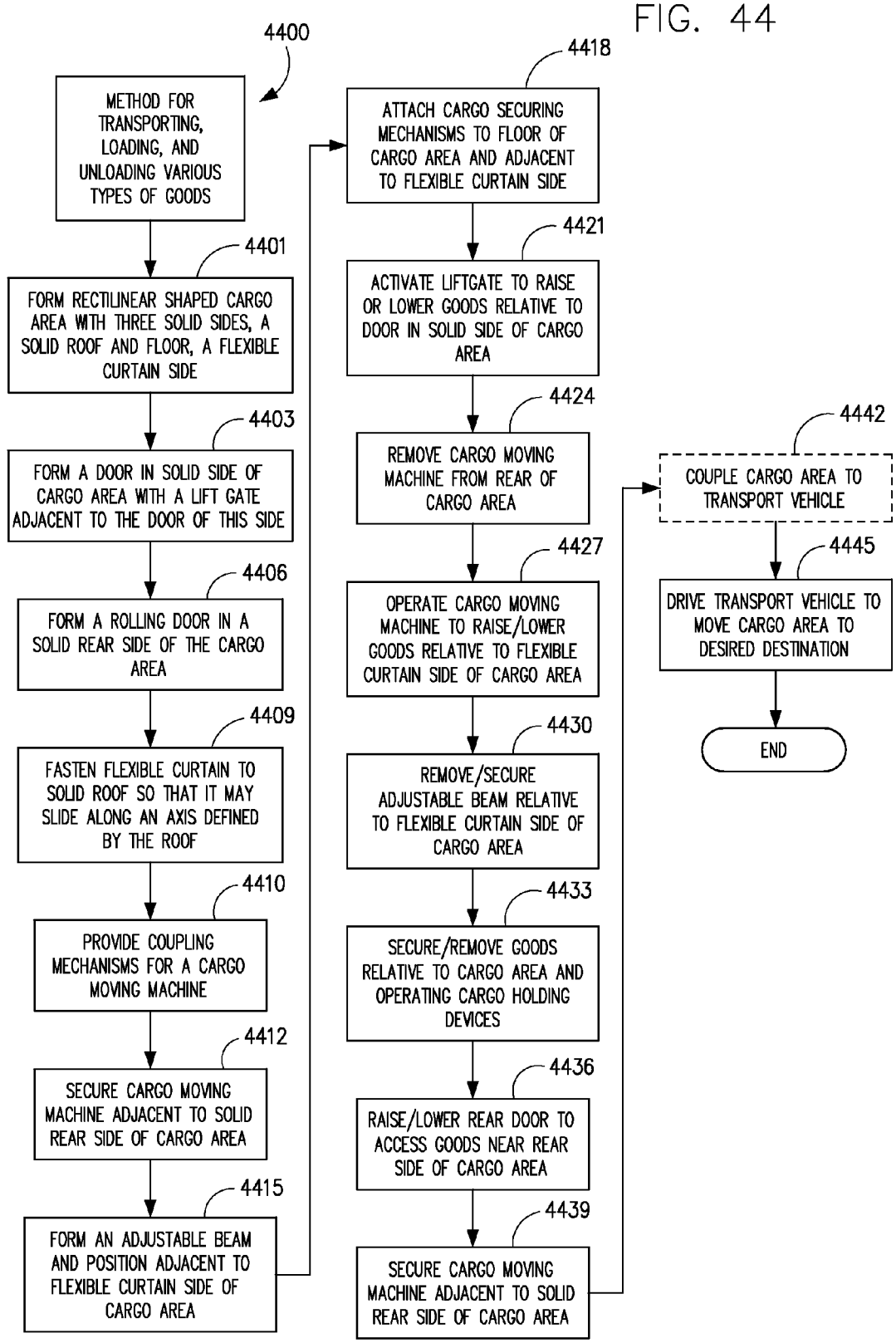
FIG. 44 is a flowchart of a method according to one exemplary embodiment of the invention.

Referring now to FIG. 44, this figure is a logic flow diagram highlighting various steps of a method 4400 for transporting, loading, and unloading movable goods according to one exemplary embodiment of the invention. Certain steps in the processes or process flow described in this specification must naturally precede others for the invention to function as described. However, the invention is not limited to the order of the steps described if such order or sequence does not alter the functionality of the invention. That is, it is recognized that some steps may performed before, after, or parallel other steps without departing from the scope and spirit of the invention. In some instances, certain steps can be deleted or not performed without departing from the invention.

Step 4401 is the first step of the process or method 4400 in which a rectilinear shaped cargo area 105 is formed with three solid sides 107, 705, and 1105, a solid roof 907 and floor 307, and a flexible curtain side 305. As noted above, the invention is not limited to rectilinear shapes and can include other polygonal shapes.

Next, in step 4403, a door 103 is formed in a solid side 107 of the cargo area 105 and a liftgate 109 is positioned adjacent to the door 103 as illustrated in FIG. 1. The door 103 can have various geometrical shapes as noted above. The side mount liftgate 109 can comprise a powering system 127 that has hydraulics for raising and lowering a platform 128 of the liftgate 109. The side mount liftgate 109 can comprise other types of powering systems instead of the hydraulic type. For example, the powering system could comprise an electric motor for driving chains/cables and/or pulleys. The side mount liftgate 109 may be referred to in the industry as a side loader type. Other types of liftgates 109 within the scope of the invention, include, but are not limited to, flipaway types, rail-types, slide away types, level lift types, conventional types, and other like liftgates.

Subsequently, in step 4406, a rolling door 705 can be formed in a solid rear side of the cargo area 105 as illustrated in FIG. 6. The invention is not limited to rolling doors 705 and can comprise other types of doors such as a hinged door.

In step 4409, a flexible curtain 305 can be fastened to the solid roof 907 so that it may slide along an axis defined by the roof 907 as illustrated in FIGS. 8-9. Slidable couplers 2505 such as those illustrated in FIGS. 25-27 may be used. However, slidable couplers, other than those illustrated, are within the scope of the invention.

In step 4410, coupling mechanisms 3805, 4005, 4105 are provided for a cargo moving machine 112. The coupling mechanisms 3805, 4005, 4105 can include, but are not limited to chains, cotter-pins, and bolts. The cargo moving machine 112 may comprise a forklift, however, other cargo moving machines 112 are within the scope of the invention. Other cargo moving machines 112 can include, but are not limited to, dollies, pallet jacks, reach trucks, stackers, hand carts, and other like cargo moving machines.

Next, in step 4412, the cargo moving machine 112 is secured adjacent to a solid rear side of the cargo area 105 using the coupling mechanisms 3805, 4005, 4105 described above. In step 4415, an adjustable beam 135 is formed and positioned adjacent to the flexible curtain side 305 of the cargo area 105.

Subsequently, in step 4418, the cargo securing mechanisms 407 of FIG. 4 are attached to a floor portion 307 of the cargo area 105 and adjacent to the flexible curtain side 305. In step 4421, the liftgate 109 may be activated to raise or lower goods relative to the door 103 in the solid side 107 of the cargo area 105.

In step 4424, the cargo moving machine 112 can be removed from the rear 115 of the cargo area 105. Next, in step 4427, the cargo moving machine 112 can be operated to raise or lower goods relative to the flexible curtain side 305 of the cargo area 105. In step 4430, the adjustable center beam 135 can be removed or secured relative to the flexible curtain side 305 of the cargo area 105.

In step 4433, the goods can be removed/secured by operating the cargo securing mechanisms 407. For example, the winch 3005 of the cargo securing mechanism 407 can be rotated.

In step 4436, the rear door 705 can be raised or lowered to access goods near the rear section 115 of the cargo area 105. The cargo moving machine 112, in step 4439, can then be secured adjacent the solid, rear side 705 of the cargo area 105.

In step 4442, the cargo area 105 can be coupled to a motor vehicle or transport vehicle 117. It is noted that this 4442 step may be practiced earlier in the process or method 4400 such as after step 4401, when the cargo 105 area is formed. Subsequently, in step 4445, the transport vehicle or motor vehicle 117 is driven to a desired destination. As noted above, the motor vehicle 117 may comprise a truck. The invention can include other types of motor vehicles 117, such as, but not limited to, freight cars pulled by locomotives (trains), ships, planes, tractor trailers (i.e.—known in the U.S. as "eighteen wheelers") and the like. The process 4400 then ends.

While various orientations of the system 100 have been referenced, such as top, bottom, front, and back, one of ordinary skill in the art recognizes that the invention is not limited to these described, exemplary orientations. While the force of gravity may dictate orientation of certain elements of the system 100, reversing the order of system elements relative to their described orientations are designs which are included within the scope of the invention.

Further, alternative embodiments for transport system 100 will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention.

What is claimed is:

1. A system for transporting goods comprising:
   a motor vehicle;
   a cargo area defined by four walls; a first wall comprising a substantially solid material and a door; a second wall comprising a flexible curtain, wherein the second wall further comprises a fastening mechanism for securing the flexible curtain to a floor portion of the cargo area, the fastening mechanism comprising a strap and buckle, wherein the second wall further comprises a slidable coupler for slidably coupling the curtain to a roof portion of the cargo area, the slidable coupler comprising a roller;
   a removable beam coupled to the roof portion of the cargo area and positioned adjacent to the second wall, the removable beam being collapsible, the moveable beam being slideably engaged with the roof portion by a hinge and track system; and
   a cargo moving machine coupled to the cargo area and adjacent to a third wall of the four walls.

2. The system of claim 1, further comprising a side-mount liftgate coupled adjacent to the door.

3. The system of claim 1, wherein the third wall comprises a rolling door.

4. The system of claim 1, wherein the motor vehicle comprises a truck.

5. The system of claim 1, wherein the cargo moving machine is removably attached to the cargo area.

6. The system of claim 1, wherein the cargo moving machine comprises a forklift.

7. A system for transporting goods comprising:
   a motor vehicle;
   a cargo area defined by four walls;
   a first wall comprising a substantially solid material and a door;
   a second wall comprising a flexible curtain, wherein the second wall further comprises a fastening mechanism for securing the flexible curtain to a floor portion of the cargo area, the fastening mechanism comprising a strap and buckle, wherein the second wall further comprises a slidable coupler for slidably coupling the curtain to a roof portion of the cargo area, the slidable coupler comprising a roller;
   a removable beam coupled to the roof portion of the cargo area and positioned adjacent to the second wall, the removable beam being collapsible, the moveable beam being slideably engaged with the roof portion by a hinge and track system; and
   a side-mount liftgate coupled adjacent to the door.

8. The system of claim 7, further comprising a cargo moving machine coupled to the cargo area and adjacent to a third wall of the four walls.

9. The system of claim 8, wherein the cargo moving machine is removably attached to the cargo area.

10. The system of claim 8, wherein the cargo moving machine comprises a forklift.

11. The system of claim 7, wherein the third wall comprises a rolling door.

12. The system of claim 7, wherein the motor vehicle comprises a truck.

13. A system for transporting goods comprising:
    a cargo area defined by four walls;
    a first wall comprising a substantially solid material and a hinged door;
    a second wall comprising a flexible curtain, wherein the second wall further comprises a fastening mechanism for securing the flexible curtain to a floor portion of the cargo area, the fastening mechanism comprising a strap and buckle, wherein the second wall further comprises a slidable coupler for slidably coupling the curtain to a roof portion of the cargo area, the slidable coupler comprising a roller;
    a removable beam coupled to the roof portion of the cargo area and positioned adjacent to the second wall, the removable beam being collapsible, the moveable beam being slideably engaged with the roof portion by a hinge and track system; and
    a third wall comprising a rolling door.

14. The system of claim 13, further comprising a cargo moving machine coupled to the cargo area and adjacent to the third wall of the four walls.

15. The system of claim 13, further comprising a side-mount liftgate coupled adjacent to the hinged door.

16. The system of claim 13, wherein the motor vehicle comprises a truck.

17. The system of claim 13, wherein the cargo moving machine is removably attached to the cargo area.

18. The system of claim 17, further comprising a motor vehicle.

19. A method for transporting and loading movable goods comprising:
    forming a cargo area with three solid sides, a solid roof, a solid floor, and a flexible curtain side, wherein the flexible curtain side further comprises a fastening mechanism for securing the flexible curtain side to a floor portion of the cargo area, the fastening mechanism comprising a strap and buckle, wherein the flexible curtain side further comprises a slidable coupler for slidably coupling a curtain to a roof portion of the cargo area, the slidable coupler comprising a roller;
    coupling a removable beam to the roof portion of the cargo area and positioning it adjacent to the flexible curtain side, the removable beam being collapsible, the moveable beam being slideably engaged with the roof portion by a hinge and track system;
    forming a door in one of the solid sides; and
    positioning a liftgate adjacent to the door.

20. The method of claim 19, further comprising coupling a cargo moving machine to the cargo area.

21. The method of claim 20, wherein the door is a first door, the method further comprising forming a second door in another one of the solid sides of the cargo area.

22. The method of claim 20, further comprising coupling a motor vehicle to the cargo area.

* * * * *